United States Patent
Tan et al.

(10) Patent No.: US 10,620,469 B2
(45) Date of Patent: Apr. 14, 2020

(54) DISPLAY PANEL AND DISPLAY DEVICE

(71) Applicant: BOE TECHNOLOGY GROUP CO., LTD., Beijing (CN)

(72) Inventors: Jifeng Tan, Beijing (CN); Wei Wang, Beijing (CN); Xue Dong, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 150 days.

(21) Appl. No.: 15/750,599

(22) PCT Filed: Jul. 17, 2017

(86) PCT No.: PCT/CN2017/093133
§ 371 (c)(1),
(2) Date: Feb. 6, 2018

(87) PCT Pub. No.: WO2018/059083
PCT Pub. Date: Apr. 5, 2018

(65) Prior Publication Data
US 2019/0339566 A1    Nov. 7, 2019

(30) Foreign Application Priority Data

Sep. 30, 2016 (CN) .......................... 2016 1 0875682

(51) Int. Cl.
*G02F 1/133* (2006.01)
*G02F 1/1335* (2006.01)
(Continued)

(52) U.S. Cl.
CPC ........ *G02F 1/133504* (2013.01); *G02F 1/136* (2013.01); *G02F 1/1326* (2013.01); *G02F 1/133514* (2013.01); *G09G 3/36* (2013.01)

(58) Field of Classification Search
CPC ............. G02F 1/133602; G02F 1/1343; G02B 6/1223; G09G 3/3607
See application file for complete search history.

(56) References Cited

U.S. PATENT DOCUMENTS 6,215,928 B1 *  4/2001  Friesem .................. G02F 1/025
                                                       372/102
9,170,453 B2   10/2015  Shin et al.
(Continued)

FOREIGN PATENT DOCUMENTS

CN        102866535 A        1/2013
CN        105044975 A       11/2015
(Continued)

OTHER PUBLICATIONS

International Search Report and Written Opinion dated Sep. 30, 2017 issued in corresponding International Application No. PCT/CN2017/093133.
(Continued)

*Primary Examiner* — James A Dudek
(74) *Attorney, Agent, or Firm* — Nath, Goldberg & Meyer; Joshua B. Goldberg; Stephanie Majkut (57) ABSTRACT

A display panel and a display device are disclosed. The display panel includes a first substrate, a liquid crystal layer, a waveguide layer, a grating layer, a quantum dot color filter layer, a first electrode and a second electrode, wherein the first electrode and the second electrode are configured to adjust a refractive index of the liquid crystal layer by changing voltages applied thereto; wherein a coupling efficiency at which light is coupled out of the waveguide layer is determined according to a difference between the refractive index of the liquid crystal layer and a refractive index of the grating layer.

18 Claims, 7 Drawing Sheets

(51) Int. Cl.
  *G02F 1/13* (2006.01)
  *G02F 1/136* (2006.01)
  *G09G 3/36* (2006.01)

(56) References Cited

U.S. PATENT DOCUMENTS

| | | |
|---|---|---|
| 2006/0098140 A1 | 5/2006 | Lee |
| 2010/0060822 A1* | 3/2010 | Sun .................. C09K 11/7734 349/71 |
| 2012/0092590 A1 | 4/2012 | Shestak et al. |
| 2016/0187725 A1* | 6/2016 | Ma .................. G02F 1/133603 349/46 |

FOREIGN PATENT DOCUMENTS

| | | |
|---|---|---|
| CN | 105929587 A | 9/2016 |
| CN | 106292049 A | 1/2017 |
| CN | 206387979 U | 8/2017 |

OTHER PUBLICATIONS

First Office Action dated May 12, 2017 issued in corresponding Chinese Application No. 201610875682.X.
Second Office Action dated Aug. 22, 2017 issued in corresponding Chinese Application No. 201610875682.X.

* cited by examiner

DISPLAY PANEL AND DISPLAY DEVICE

CROSS-REFERENCE TO RELATED APPLICATIONS

This is a National Phase Application filed under 35 U.S.C. 371 as a national stage of PCT/CN2014/093133, filed Jul. 17, 2017, an application claiming the benefit of Chinese Patent Application No. 201610875682.X, filed on Sep. 30, 2016, the contents of which are incorporated herein in their entirety by reference.

TECHNICAL FIELD

The present disclosure relates to the field of display technology, and particularly relates to a display panel and a display device.

BACKGROUND

In the field of display technology, a liquid crystal display device includes a backlight and a display panel. The display panel includes an array substrate and a color filter substrate provided opposite to each other, a liquid crystal layer is provided between the array substrate and the color filter substrate, and the array substrate and the color filter substrate each are provided with a polarizer on the back. Grayscale display is achieved through deflection of liquid crystal controlled by a voltage and control of the two polarizers.

In the prior art, color resists in the color filter substrate may be made of a quantum dot material. Employing quantum dot material as color resists can improve a color gamut of the display panel, however, the quantum dot material may destroy the polarization state of an incident light, causing a problem of quantum dot depolarization, and thus the quantum dot material cannot be applied to a liquid crystal display device.

The use of a polarizer in a display panel of a liquid crystal display device in the prior art may result in a low transmittance of the liquid crystal display device (for example, a transmittance of about 7%) and a large liquid crystal cell thickness (for example, 3 μm to 5 μm), and a large cell thickness may reduce response speed of liquid crystal.

SUMMARY

The present disclosure provides a display panel, including a first substrate, a liquid crystal layer, a waveguide layer, a grating layer, a quantum dot color filter layer, a first electrode and a second electrode, wherein the liquid crystal layer, the grating layer, the quantum dot color filter layer, the first electrode and the second electrode are located between the waveguide layer and the first substrate, and the grating layer is located on a side of the waveguide layer proximal to the liquid crystal layer;

the first electrode and the second electrode are configured to adjust a refractive index of the liquid crystal layer by changing voltages applied thereto; and a coupling efficiency at which light is coupled out of the waveguide layer is determined according to a difference between the refractive index of the liquid crystal layer and a refractive index of the grating layer.

Optionally, the second electrode and the first electrode are located on one side of the liquid crystal layer, or located on different sides of the liquid crystal layer.

Optionally, the refractive index of the grating layer ranges from an ordinary refractive index $n_o$ of the liquid crystal layer to an extraordinary refractive index $n_e$ of the liquid crystal layer.

Optionally, the refractive index of the grating layer is the extraordinary refractive index $n_e$ of the liquid crystal layer.

Optionally, the display panel further includes a second substrate located on a side of the waveguide layer distal to the first substrate.

Optionally, the second electrode is located on a side of the waveguide layer proximal to the first substrate, the grating layer is located on a side of the second electrode proximal to the first substrate, and the liquid crystal layer is located on a side of the grating layer proximal to the first substrate; and the first electrode is located on a side of the first substrate proximal to the second substrate.

Optionally, the quantum dot color filter layer is located on a side of the first electrode proximal to the second substrate; or, the quantum dot color filter layer is located between the second electrode and the grating layer.

Optionally, a refractive index of the second electrode is smaller than the refractive index of the waveguide layer, and a refractive index of the second substrate is smaller than the refractive index of the waveguide layer.

Optionally, the liquid crystal layer is made of a nematic liquid crystal, a cholesteric liquid crystal, or a blue-phase liquid crystal.

Optionally, the grating layer includes shading bars arranged at intervals, and the liquid crystal layer covers the grating layer and fills gaps between the shading bars, and the liquid crystal layer has a thickness greater than a thickness of the grating layer.

Optionally, in a case where the difference between the refractive index of the liquid crystal layer and the refractive index of the grating layer is zero, the coupling efficiency at which light is coupled out of the waveguide layer is zero, so that the display panel is in L0 grayscale state; or in a case where an absolute value of the difference between the refractive index of the liquid crystal layer and the refractive index of the grating layer is equal to a set value, the coupling efficiency at which light is coupled out of the waveguide layer is a set coupling efficiency, so that the display panel is in L255 grayscale state; or in a case where the absolute value of the difference between the refractive index of the liquid crystal layer and the refractive index of the grating layer is larger than zero and smaller than the set value, the coupling efficiency at which light is coupled out of the waveguide layer is larger than zero and smaller than the set coupling efficiency, so that the display panel is in a grayscale state between the L0 grayscale state and L255 grayscale state.

The present disclosure provides a display device, including a backlight and the above-described display panel.

Optionally, the backlight is located at a side of the display panel, the backlight is arranged at least correspondingly to the waveguide layer, and a light exiting direction of light from the backlight is parallel to a plane where the waveguide layer is located.

DETAILED DESCRIPTION

To enable those skilled in the art to better understand technical solutions of the present disclosure, a display panel and a display device provided in the present disclosure will be described in detail below in conjunction with the accompanying drawings.

Figure 1:
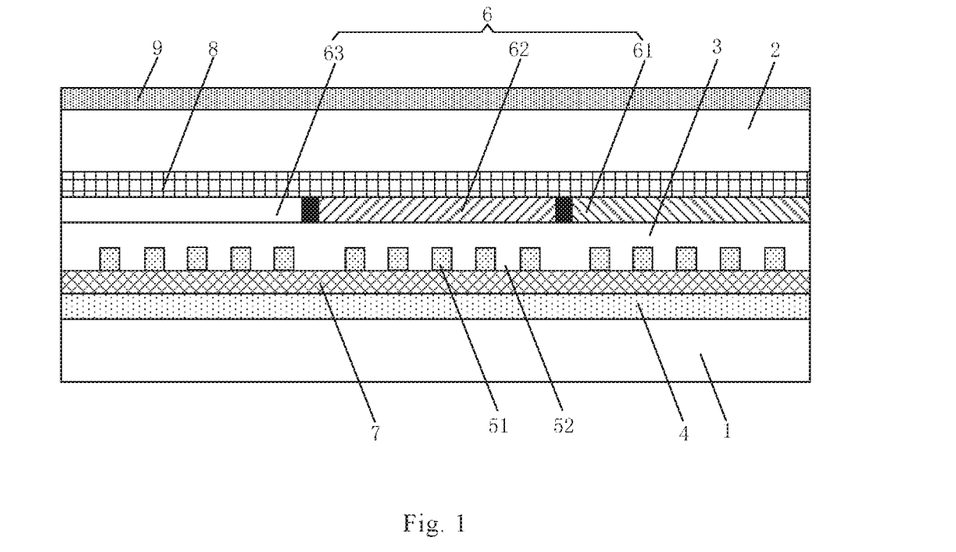
FIG. 1 is a schematic structural diagram of a display panel according to a first embodiment of the present disclosure.

FIG. 1 is a schematic structural diagram of a display panel according to a first embodiment of the present disclosure. As shown in FIG. 1, the display panel includes a first substrate 2, a liquid crystal layer 3, a waveguide layer 4, a grating layer, a quantum dot color filter layer 6, a first electrode 8 and a second electrode 7. The liquid crystal layer 3, the grating layer, the quantum dot color filter layer 6, the first electrode 8 and the second electrode 7 are positioned between the waveguide layer 4 and the first substrate 2. The first and second electrodes 8 and 7 are configured to adjust a refractive index of the liquid crystal layer 3 by changing voltages applied thereto. A coupling efficiency at which light is coupled out of the waveguide layer 4 is determined according to a difference between the refractive index of the liquid crystal layer 3 and a refractive index of the grating layer.

In the embodiment, the coupling efficiency at which light is coupled out of the waveguide layer 4 changes as the difference between the refractive index of the liquid crystal layer 3 and the refractive index of the grating layer changes. Since the refractive index of the liquid crystal layer 3 can be adjusted according to a voltage difference between the voltages applied to the first electrode 8 and the second electrode 7, the refractive index of the liquid crystal layer 3 changes when the difference between the voltages applied to the first electrode 8 and the second electrode 7 changes, so that the coupling efficiency at which light is coupled out of the waveguide layer 4 changes.

Further, the display panel may also include a second substrate 1 positioned at a side of the waveguide layer 4 distal to the first substrate 2. In the embodiment, when the display panel does not include the second substrate 1, the waveguide layer 4 may also function as a second substrate 1, that is, the waveguide layer and the second substrate may be functionally integrated.

The second substrate 1 may be made of glass or a resin, and the first substrate 2 may be made of glass or a resin. In practical applications, the second substrate 1 and the first substrate 2 may be made of other material, which is not listed herein one by one.

In the embodiment, the second electrode 7 and the first electrode 8 may be located on one side or on different sides of the liquid crystal layer 3. Optionally, the second electrode 7 may be a pixel electrode and the first electrode 8 may be a common electrode.

As shown in FIG. 1, the second electrode 7 and the first electrode 8 are located on different sides of the liquid crystal layer 3. Specifically, the second electrode 7 is on a side of the liquid crystal layer 3 proximal to the second substrate 1, and the first electrode 8 is on a side of the liquid crystal layer 3 proximal to the first substrate 2. In this case, the display panel may be a Twisted Nematic (TN) display panel, a Vertical Alignment (VA) display panel, or an Electrically Controlled Birefringence (ECB) display panel.

Alternatively, the second electrode 7 and the first electrode 8 are located on one side of the liquid crystal layer 3. Specifically, the second electrode 7 and the first electrode 8 are on a side of the liquid crystal layer 3 proximal to the second substrate 1. In a case where the second electrode 7 and the first electrode 8 are in different layers, the display panel may be an Advanced Super Dimension Switch (ADS) display panel; in a case where the second electrode 7 and the first electrode 8 are in one layer, the display panel may be an In-Plane Switching (IPS) display panel, which are not specifically illustrated herein. In practical applications, the display panel may also be any other type of display panel, which is not listed herein one by one.

The quantum dot color filter layer 6 may include a red quantum dot pattern 61, a green quantum dot pattern 62, and a transparent resin pattern 63, wherein the red quantum dot pattern 61 generates red light once excited by light having a specific wavelength, the green quantum dot pattern 62 generates green light once excited by light having the specific wavelength, the transparent resin pattern 63 allows light having the specific wavelength to transmit therethrough directly, and in this case the light having the specific wavelength is blue light. Alternatively, the quantum dot color filter layer 6 may include a red quantum dot pattern, a green quantum dot pattern, and a blue quantum dot pattern, wherein the red quantum dot pattern generates red light once excited by light having a specific wavelength, the green quantum dot pattern generates green light once excited by light having the specific wavelength, the blue quantum dot pattern generates blue light once excited by light having the specific wavelength, in this case the light having the specific wavelength may be light having a wavelength shorter than that of blue light, and this case is not specifically illustrated. The quantum dot color filter layer 6 is on a side of the first substrate 2 proximal to the second substrate 1. In practical applications, the quantum dot color filter layer 6 may also be on a side of the first substrate 2 distal to the second substrate 1, and this case is not specifically illustrated.

The liquid crystal layer 3 may be made of a nematic liquid crystal, a cholesteric liquid crystal, or a blue-phase liquid crystal. Optionally, a TN display panel, a VA display panel and an ADS display panel generally employ a nematic liquid crystal. Optionally, the grating layer may include shading bars 51 arranged at intervals, and the liquid crystal layer 3 covers the grating layer and fills gaps 52 between the shading bars 51. The liquid crystal layer 3 has a thickness greater than that of the grating layer. Generally, the grating layer has a thickness smaller than or equal to 200 nm, and the liquid crystal layer 3 has a thickness greater than 200 nm and smaller than 20 μm, preferably a thickness of 1 μm. The thickness of the liquid crystal layer 3 may be determined such as to be able to cover the grating layer and to facilitate other parameter settings of the product (for example, electrical design, driving design, etc.). In the embodiment, the liquid crystal layer 3 is only required to have a sufficient thickness to cover the grating layer, thus, the liquid crystal layer 3 can be provided with a very small thickness, that is, a liquid crystal cell thickness can be very small, thereby further improving response time of the liquid crystal.

As shown in FIG. 1, in the embodiment, the second electrode 7 is on a side of the waveguide layer 4 proximal to the first substrate 2, the grating layer is on a side of the second electrode 7 proximal to the first substrate 2 the liquid crystal layer 3 is on a side of the grating layer proximal to the first substrate 2, and the first electrode 8 is on a side of the first substrate 2 proximal to the second substrate 1.

The quantum dot color filter layer 6 is on a side of the first electrode 8 proximal to the second substrate 1, and specifically, the quantum dot color filter layer 6 is between the first electrode 8 and the liquid crystal layer 3.

Specifically, the grating layer is between the liquid crystal layer 3 and the second electrode 7. The grating layer may be made of a transparent medium material such as silicon dioxide (SiO$_2$) or other organic resin. The grating layer may have a refractive index ranging from an ordinary refractive index n$_o$ of the liquid crystal layer 3 to an extraordinary refractive index n$_e$ of the liquid crystal layer 3, and preferably, the refractive index of the grating layer may be equal to the extraordinary refractive index n$_e$ of the liquid crystal layer 3. The grating layer may have a thickness ranging from, but not limited to, 200 nm to 1 μm, and preferably, have a thickness of 500 nm. In practical applications, since the process of controlling, by the grating layer, light to be coupled out of the waveguide layer 4 is not particularly sensitive to the thickness of the grating layer, the thickness of the grating layer can be set as required. For example, portions of the grating layer corresponding to a red pixel (red quantum dot pattern 61), a green pixel (green quantum dot pattern 62) and a blue pixel (transparent resin pattern 63) may have a same thickness or different thicknesses. Optionally, the grating layer may have a duty ratio of 0.5 in a period, but in practical design of product, the duty ratio in a period may be set as required, for example, for the purpose of adjusting intensity of emergent light, or for the porpoise of balancing differences in brightness among different positions of the display panel.

Specifically, the waveguide layer 4 is between the second substrate 1 and the second electrode 7. The waveguide layer 4 may be made of a transparent material, for example, silicon nitride Si$_3$N$_4$. The waveguide layer 4 has a thickness in the range of, but not limited to, 10 nm to 10 μm, and preferably, the thickness of the waveguide layer 4 is 100 nm, so as to facilitate control of the grating layer on direction and wavelength of emergent light. Generally, the waveguide layer 4 is a single mode waveguide, that is, its thickness should be thin enough, but in a case where light from an edge type collimated backlight has good collimation or coupling mode into the waveguide layer 4 can be effectively controlled, the requirement on the thickness of the waveguide layer 4 may be relaxed. For example, the thickness of the waveguide layer 4 may be set to be several hundred nanometers or even several micrometers. Because the thickness of the waveguide layer 4 is much smaller than the thickness of the second electrode 7 and the thickness of the waveguide layer 4 is much smaller than the thickness of the second substrate 1, most of light emitted by the edge type collimated backlight will be coupled into the second electrode 7 and the second substrate 1. Since the light emitted by the edge type collimated backlight cannot be absolutely collimated, and there is always a small divergence angle, light coupled into the second electrode 7 and the second substrate 1 also has a small divergence angle. Furthermore, since the refractive index of the second electrode 7 is smaller than the refractive index of the waveguide layer 4 and the refractive index of the second substrate 1 is smaller than the refractive index of the waveguide layer 4, light in the second electrode 7 and the second substrate 1 cannot be well confined, and is injected into the waveguide layer 4 to compensate for attenuation of the waveguide mode of the waveguide layer 4 due to propagation or coupling of the grating layer. In summary, the second electrode 7 and the second substrate 1 function as an auxiliary waveguide.

Further, the display panel further includes a scattering film 9. The scattering film 9 is on a side of the first substrate 2 distal to the second substrate 1. The scattering film 9 plays a function of scattering light coupled out of the waveguide layer 4 under the control of the grating layer and having a small or large angle, thereby improving a viewing angle of the display panel.

Further, optionally, the display panel may also include alignment films (not illustrated) provided at both sides of the liquid crystal layer 3. Specifically, an alignment film may be provided on the quantum dot color filter layer 6, and an alignment film may be provided on the grating layer. By providing an alignment film, an initial alignment state of liquid crystal molecules in the liquid crystal layer 3 can be controlled, ensuring that the liquid crystal molecules can be deflected in an expected manner under an applied voltage, so as to determine a display mode to be either a normal black display mode or a normal white display mode. It is to be noted that when the liquid crystal layer 3 is made of a blue-phase liquid crystal, since alignment is not necessary for the blue-phase liquid crystal, the display panel may be provided with no alignment film.

Further, the display panel further includes gate lines, data lines and thin film transistors. The gate lines, the data lines and the thin film transistors may be located between the waveguide layer 4 and the second electrode 7. Each thin film transistor includes a gate, an active layer, a source and a drain, and the second electrode 7 is connected to the drain of the thin film transistor. The thin film transistors are not shown in FIG. 1.

As an optional embodiment, as shown in FIG. 1, the display panel may include a color filter substrate and an array substrate provided opposite to each other. The array substrate includes the second substrate 1, the waveguide layer 4, the second electrode 7 and the grating layer, which are sequentially provided, the color filter substrate includes the first substrate 2, the first electrode 8 and the quantum dot color filter layer 6, which are provided sequentially, and the liquid crystal layer 3 is provided between the color filter substrate and the array substrate.

Figure 2:
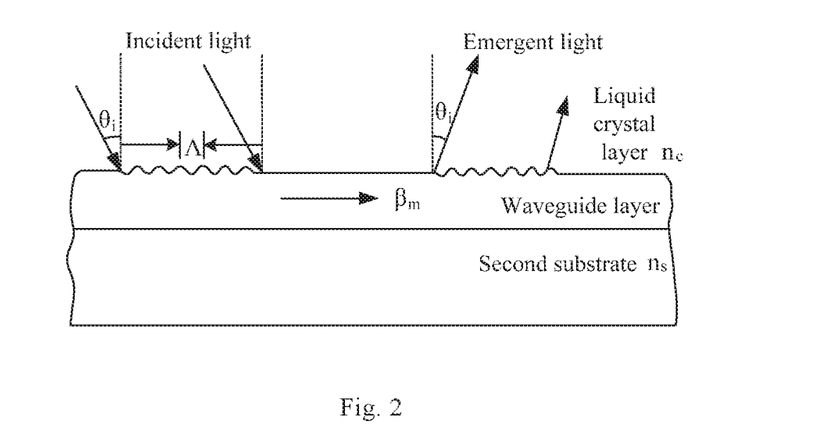
FIG. 2 is a schematic diagram showing waveguide coupling of a grating layer in FIG. 1.

FIG. 2 is a schematic diagram showing light coupling of a grating waveguide in FIG. 1. As shown in FIG. 2, the liquid crystal layer 3, the grating layer and the waveguide layer 4 form a variable grating coupler, which can effectively couple light into and out of the waveguide layer 4. When incident or emergent light satisfies the phase matching condition of $\beta_q = \beta_m - qK$, ($q = 0, \pm 1, \pm 2, \ldots$), where $\beta_q$ is a propagation constant of incident light, $\beta_m$ is a propagation constant of m-th order guided mode, q is an order of diffraction, and K is a grating vector, the incident light may excite m-th order guided mode in the waveguide layer 4, or m-th order guided mode may be coupled out in a given direction. Because $\beta_m = k_0 N_m$, and $K = 2\pi/\Lambda$, the above phase matching equation may be further expressed as $k_0 n_c \sin\theta_i = k_0 N_m - q2\pi/\Lambda$, ($q=0, \pm1, \pm2, \ldots$), where $k_0 = 2\pi/\lambda$, $n_c$ is the refractive index of the liquid crystal layer 3, $\theta_i$ is an included angle between a wave vector direction of the incident light and a vertical direction or an included angle between a wave vector direction of the emergent light and the vertical direction, $N_m$ is an effective refractive index of the m-th order guided mode, and $\Lambda$ is a period of the grating layer. It can be seen from the above phase matching equation that, by changing the refractive index $n_c$ of the liquid crystal layer 3, the grating layer can control a coupling efficiency at which light is coupled out of the waveguide layer 4, the coupling efficiency being dependent upon a difference in refractive indices between the liquid crystal layer 3 and the grating layer. The period of the grating layer is generally small (for example, several microns or several hundreds of nanometers), thus, pixels may be designed to have a small size, and therefore, the structure of the display panel is an ideal selection to realize high PPI display.

Optionally, as shown in FIG. 2, if the second substrate 1 is made of a transparent medium, then the phase matching equation $\beta_q = \beta_m - qK$, ($q=0, \pm1, \pm2, \ldots$) may be further written as $k_0 n_s \sin\theta_i = k_0 N_m - q2\pi/\Lambda$, ($q=0, \pm1, \pm2, \ldots$), where $n_s$ is a refractive index of the second substrate 1. Light may be coupled into the waveguide layer 4 from a side of the second substrate 1, and then coupled out of the waveguide layer 4.

In the embodiment, the refractive index of the liquid crystal layer 3 is adjusted by adjusting the difference between the voltages applied to the second electrode 7 and the first electrode 8. As the refractive index of the liquid crystal layer 3 changes, the difference between the refractive index of the liquid crystal layer 3 and the refractive index of the grating layer changes, and therefore, the coupling efficiency at which light is coupled out of the waveguide layer 4 is controlled by controlling the difference between the refractive index of the liquid crystal layer 3 and the refractive index of the grating layer.

When the difference between the refractive index of the liquid crystal layer 3 and the refractive index of the grating layer is zero, the coupling efficiency at which light is coupled out of the waveguide layer 4 is zero, so that the display panel is in L0 grayscale state. In this case, the function of the grating layer is disabled, and no light is coupled out of the waveguide layer 4, and in this case, the display panel is in L0 grayscale state.

When an absolute value of the difference between the refractive index of the liquid crystal layer 3 and the refractive index of the grating layer is a set difference, the coupling efficiency at which light is coupled out of the waveguide layer 4 is a set coupling efficiency, so that the display panel is in L255 grayscale state. In this case, because the absolute value of the difference between the refractive index of the liquid crystal layer 3 and the refractive index of the grating layer is the maximum difference, and the refractive index of the grating layer is fixed, the refractive index of the liquid crystal layer 3 can be adjusted between the ordinary refractive index $n_o$ and the extraordinary refractive index $n_e$ such that the absolute value of the difference between the adjusted refractive index of the liquid crystal layer 3 and the refractive index of the grating layer is a maximum value, in this case, the set difference is the maximum difference, the corresponding set coupling efficiency is the maximum coupling efficiency, the liquid crystal layer 3 have the maximum effect, the amount of light that is coupled out from the waveguide layer 4 is the largest, and at this point, the display panel is in L255 grayscale state.

When the absolute value of the difference between the refractive index of the liquid crystal layer 3 and the refractive index of the grating layer is larger than zero but smaller than the set difference, the coupling efficiency at which light is coupled out of the waveguide layer 4 is larger than zero but smaller that the set coupling efficiency, so that the display panel is in a grayscale state between the L0 grayscale state and the L255 grayscale state. In this case, the coupling efficiency is between zero and the maximum coupling efficiency, so that the display panel is in an intermediate grayscale state. By adjusting the difference between the refractive index of the liquid crystal layer 3 and the refractive index of the grating layer, the display panel can be in different grayscale states.

The display panel of the embodiment includes a first substrate, a liquid crystal layer, a waveguide layer, a grating layer, a quantum dot color filter layer, a first electrode and a second electrode. The first electrode and the second electrode are configured to adjust the refractive index of the liquid crystal layer by changing voltages applied thereto, and the coupling efficiency at which light is coupled out of the waveguide layer is determined according to a difference between the refractive index of the liquid crystal layer and the refractive index of the grating layer. In the embodiment, there is no need to provide a polarizer in the display panel, avoiding the problem of quantum dot depolarization, and thus making it possible to apply quantum dot material to a liquid crystal display device. In the embodiment, there is no need to provide a polarizer in the display panel, thereby improving the transmittance of the display panel. In the embodiment, since there is no need to provide a polarizer in the display panel, there is no requirement on amount of phase retardation of the entire liquid crystal layer, so that a liquid crystal cell may be set to have a smaller thickness, thereby improving response time of the liquid crystal. Since the display panel of the embodiment has high transmittance, the display panel can be applied to a transparent display product. In the embodiment, the display panel employs a quantum dot material as a color filter, which has a narrow FWHM (full width at half maximum) at the wavelength of emergent light, a pure color and a high color gamut.

Thus, the display panel of the embodiment enables the use of quantum dot material in a liquid crystal display device, improving the transmittance of the display panel, and improving response time of the liquid crystal.

Figure 3:
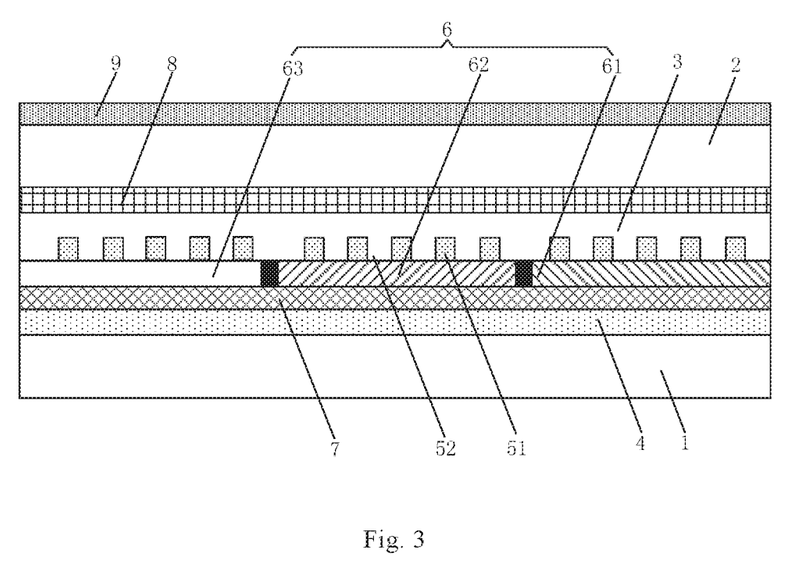
FIG. 3 is a schematic structural diagram of a display panel according to a second embodiment of the present disclosure.

FIG. 3 is a schematic structural diagram of a display panel according to a second embodiment of the present disclosure. As shown in FIG. 3, this embodiment differs from the first embodiment in that, the quantum dot color filter layer 6 of this embodiment is on a side of the second substrate 1 proximal to the first substrate 2. Specifically, the quantum dot color filter layer 6 is between the second electrode 7 and the grating layer. Descriptions of the other structures in the embodiment may refer to those in the first embodiment, and are not repeated herein.

In the embodiment, since the quantum dot color filter layer 6 is on a side of the second substrate 1, the second substrate 1, the waveguide layer 4, the second electrode 7, the quantum dot color filter layer 6 and the grating layer form a color-filter on array (COA).

The display panel of the embodiment includes a first substrate, a liquid crystal layer, a waveguide layer, a grating layer, a quantum dot color filter layer, a first electrode and a second electrode. The first electrode and the second electrode can adjust the refractive index of the liquid crystal layer, the grating layer controls light to be coupled out of the waveguide layer, and the coupling efficiency at which light is coupled out of the waveguide layer is determined according to a difference between the refractive index of the liquid crystal layer and the refractive index of the grating layer. In the embodiment, there is no need to provide a polarizer in the display panel, avoiding the problem of quantum dot depolarization, and thus making it possible to apply quantum dot material to a liquid crystal display device. In the embodiment, there is no need to provide a polarizer in the display panel, thereby improving the transmittance of the display panel. In the embodiment, since there is no need to provide a polarizer in the display panel, there is no requirement on amount of phase retardation of the entire liquid crystal layer, so that a liquid crystal cell may be set to have a smaller thickness, thereby improving response time of the liquid crystal. Since the display panel of the embodiment has high transmittance, the display panel can be applied to a transparent display product. In the embodiment, the display panel employs a quantum dot material as a color filter, which has a narrow FWHM (full width at half maximum) at the wavelength of emergent light, a pure color and a high color gamut.

Figure 4:
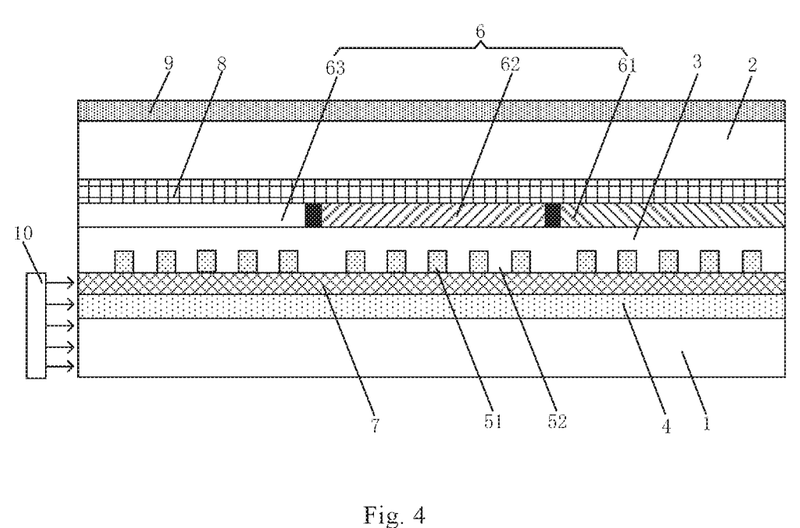
FIG. 4 is a schematic structural diagram of a display device according to a third embodiment of the present disclosure.

FIG. 4 is a schematic structural diagram of a display device according to a third embodiment of the present disclosure. As shown in FIG. 4, the display device includes a backlight 10 and the display panel.

In the embodiment, the backlight 10 is arranged at a side of the display panel, and therefore, the backlight in the embodiment is an edge type backlight. In practical applications, a backlight in other form may also be used. For example, the backlight may be a direct type backlight, which is not specifically illustrated.

The backlight 10 may include an LED light source or a light source of another form. The LED chip may include a blue light LED or an LED of light having a wavelength shorter than blue light. The light source in another form may be a laser light source. Optionally, in a case where the backlight 10 is a laser light source, a beam expanding structure may be further provided on a light exiting side of the backlight 10 (i.e., between the backlight 10 and the display panel), and the beam expanding structure can not only expand laser light, as a laser point light source, emitted by the laser light source into a collimated light source, but also increase a diameter of a light beam.

The backlight 10 is provided at least correspondingly to the waveguide layer 4, and a light exiting direction of light from the backlight 10 is parallel to a plane where the waveguide layer 4 is located. As shown in FIG. 1, the backlight 10 is provided correspondingly to the second substrate 1, the waveguide layer 4 and the second electrode 7, and a width of the backlight 10 may be the sum of widths of the second substrate 1, the waveguide layer 4 and the second electrode 7. In practical applications, the backlight 10 may be set to have other width, but it is preferable that the backlight 10 does not emit light towards the liquid crystal layer 3 and layers above the liquid crystal layer 3. Since a sealant is provided on outer side of the liquid crystal layer 3, light emitted towards the liquid crystal layer 3 will not enter into the liquid crystal layer 3.

Preferably, light emitted from the backlight 10 is collimated light. In particular, when the backlight 10 is a laser light source, light emitted from the backlight 10 becomes collimated light due to the beam expanding structure. In the embodiment, light emitted from the backlight 10 may be blue light.

The display device of the embodiment employs the display panel shown in FIG. 1, the detailed description of which may refer to that in the first embodiment and is not repeated herein.

Optionally, the display device of the embodiment may also employ the display panel shown in FIG. 2, the detailed description of which may refer to that in the second embodiment and is not illustrated herein.

In this embodiment, the display device may be an ECB display device, a TN display device, a VA display device, an IPS display device, or an ADS display device.

Figure 5A:
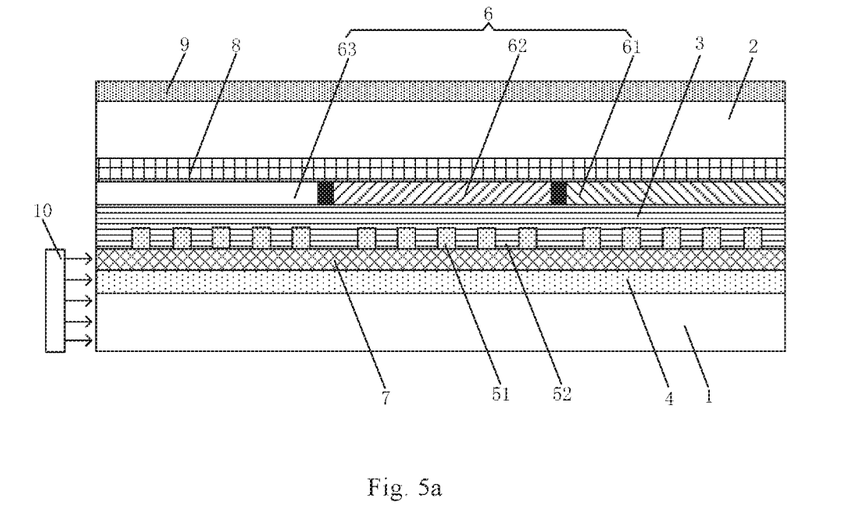
FIG. 5a is a schematic diagram of a display device, which is an ECB display device, in a display mode.
Figure 5B:
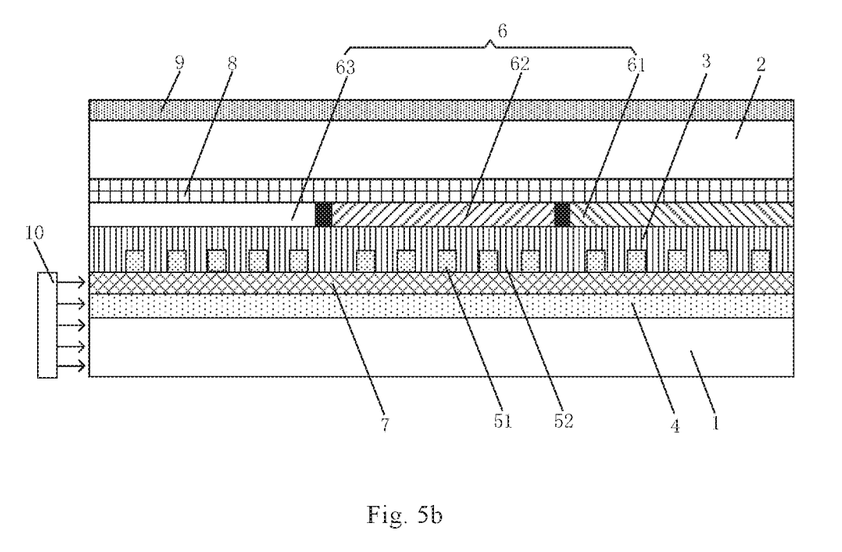
FIG. 5b is a schematic diagram of a display device, which is an ECB display device, in another display mode.

FIG. 5a is a schematic diagram of a display device, which is an ECB display device, in a display mode, and FIG. 5b is a schematic diagram of a display device, which is an ECB display device, in another display mode. As shown in FIGS. 5a and 5b, the liquid crystal layer 3 may be made of a nematic liquid crystal. As shown in FIG. 5a, the difference between the voltages applied to the second electrode 7 and the first electrode 8 is adjusted to adjust orientations of liquid crystal molecules in the liquid crystal layer 3, such that the refractive index of the liquid crystal layer 3 is equal to the refractive index of the grating layer, in this case, the grating layer controls light not to be coupled out of the waveguide layer 4, and thus the ECB display device is in L0 grayscale state. As shown in FIG. 5b, the difference between the voltages applied to the second electrode 7 and the first electrode 8 is adjusted to adjust orientations of liquid crystal molecules in the liquid crystal layer 3 such that the absolute value of the difference between the refractive index of the liquid crystal layer 3 and the refractive index of the grating layer is the set difference, which is the maximum difference, in this case, the grating layer controls light to be coupled out of the waveguide layer 4 at a set coupling efficiency, which is the maximum coupling efficiency, thus the ECB display panel is in L255 grayscale state. It should be noted that the patterns in the liquid crystal layer 3 in FIGS. 5a and 5b merely indicate that liquid crystal molecules in the two figures are orientated differently but not intended to limit the orientations of the liquid crystal molecules.

Figure 6A:
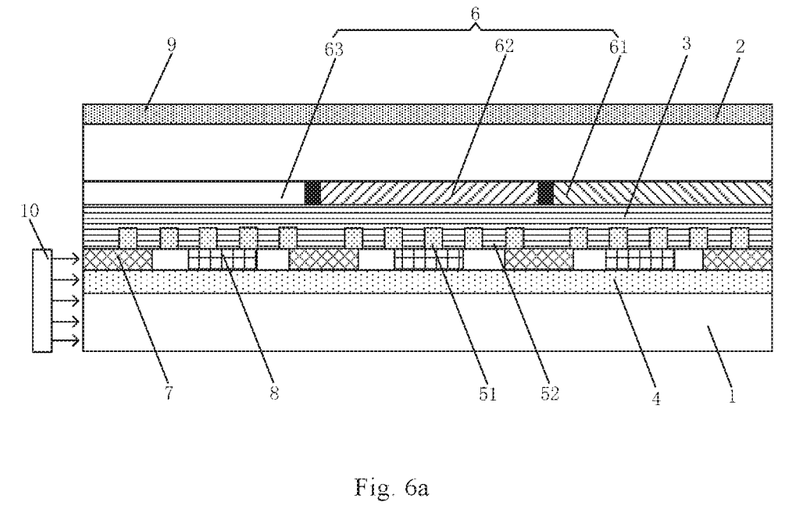
FIG. 6a is a schematic diagram of a display device, which is an IPS display device, in a display mode.
Figure 6B:
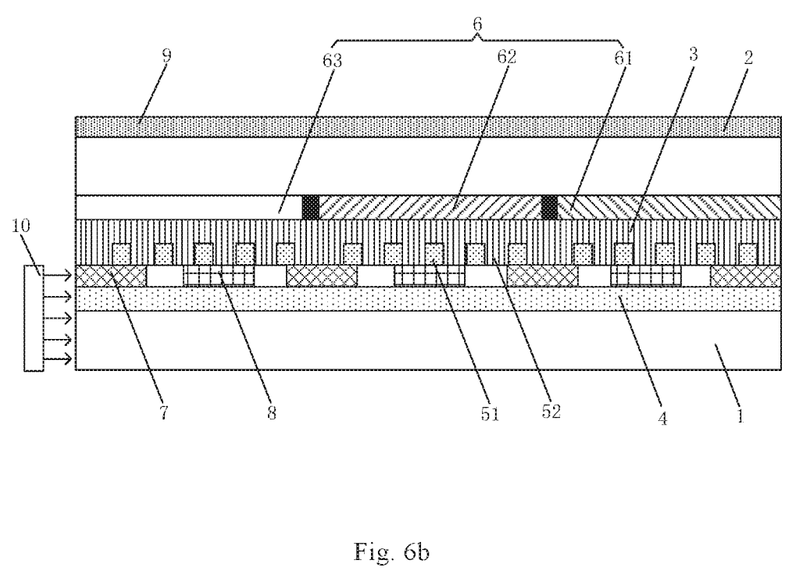
FIG. 6b is a schematic diagram of a display device, which is an IPS display device, in another display mode.

FIG. 6a is a schematic diagram of a display device, which is an IPS display device, in a display mode, and FIG. 6b is a schematic diagram of a display device, which is an IPS display device, in another display mode. The display device of FIGS. 6a and 6b differs from the display device of FIG. 4 in that, the second electrode 7 and the first electrode 8 are both between the waveguide layer 4 and the grating layer, and the second electrode 7 and the first electrode 8 are provided alternately in one layer. As shown in FIGS. 6a and 6b, the liquid crystal layer 3 may be made of a nematic liquid crystal. As shown in FIG. 6a, the difference between the voltages applied to the second electrode 7 and the first electrode 8 is adjusted to adjust orientations of liquid crystal molecules in the liquid crystal layer 3 such that the refractive index of the liquid crystal layer 3 is equal to the refractive index of the grating layer, in this case, the grating layer controls light not to be coupled out of the waveguide layer 4, and thus the IPS display device is in L0 grayscale state. As shown in FIG. 6b, the difference between the voltages applied to the second electrode 7 and the first electrode 8 is adjusted to adjust orientations of liquid crystal molecules in the liquid crystal layer 3 such that the absolute value of the difference between the refractive index of the liquid crystal layer 3 and the refractive index of the grating layer is the set difference, which is the maximum difference, in this case, the grating layer controls the coupling efficiency at which light is coupled out of the waveguide layer 4 is the set coupling efficiency, which is the maximum coupling efficiency, and thus the IPS display panel is in L255 grayscale state. It should be noted that the patterns in the liquid crystal layer 3 in FIGS. 6a and 6b merely indicate that liquid crystal molecules in the two figures are orientated differently but not intended to limit the orientations of the liquid crystal molecules.

Figure 7A:
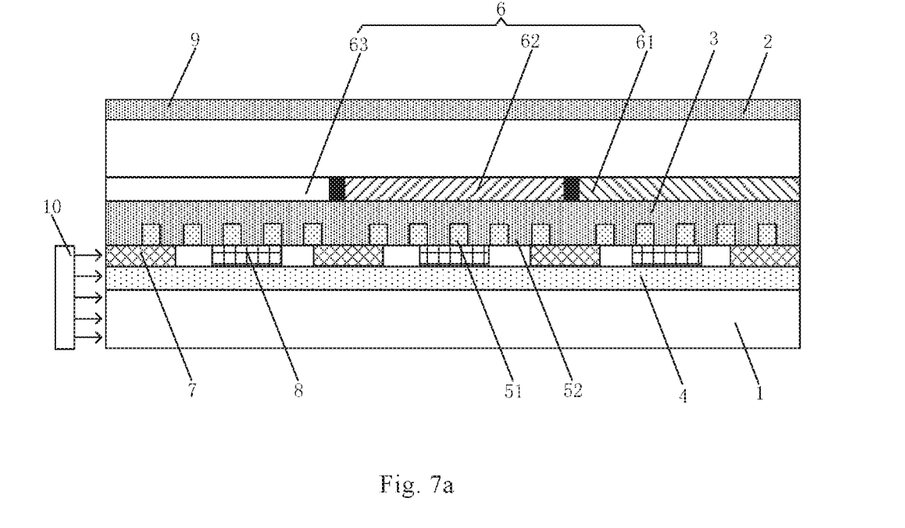
FIG. 7a is a schematic diagram of a display device, which is an IPS display device, in a display mode.
Figure 7B:
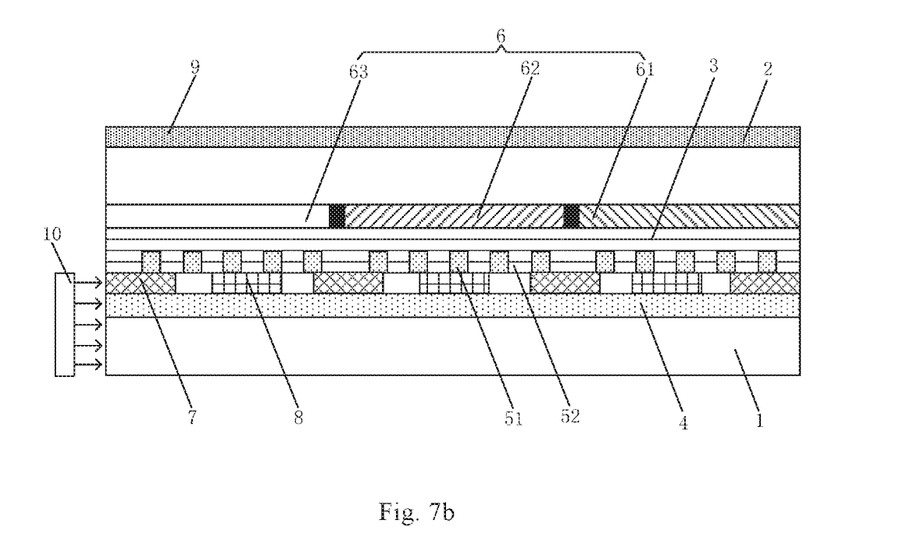
FIG. 7b is a schematic diagram of a display device, which is an IPS display device, in another display mode.

FIG. 7a is a schematic diagram of a display device, which is an IPS display device, in a display mode, and FIG. 7b is a schematic diagram of a display device, which is an IPS display device, in another display mode. The display device of FIGS. 7a and 7b differs from the display device of FIG. 4 in that, the second electrode 7 and the first electrode 8 are both between the waveguide layer 4 and the grating layer, and the second electrode 7 and the first electrode 8 are provided alternately in one layer. As shown in FIGS. 7a and 7b, the liquid crystal layer 3 may be made of a blue-phase liquid crystal. As shown in FIG. 7a, the difference between the voltages applied to the second electrode 7 and the first electrode 8 is adjusted to adjust liquid crystal molecules in the liquid crystal layer 3 to be isotropic, such that the refractive index of the liquid crystal layer 3 is equal to the refractive index of the grating layer, in this case, the grating layer controls light not to be coupled out of the waveguide layer 4, and thus the IPS display device is in L0 grayscale state. As shown in FIG. 7b, the difference between the voltages applied to the second electrode 7 and the first electrode 8 is adjusted to adjust liquid crystal molecules in the liquid crystal layer 3 to be anisotropic such that the absolute value of the difference between the refractive index of the liquid crystal layer 3 and the refractive index of the grating layer is the set difference, which is the maximum difference, in this case, the grating layer controls the coupling efficiency at which light is coupled out of the waveguide layer 4 is the set coupling efficiency, which is the maximum coupling efficiency, and thus the IPS display panel is in L255 grayscale state. It should be noted that the patterns in the liquid crystal layer 3 in FIGS. 7a and 7b merely indicate that liquid crystal molecules in the two figures are isotropic or anisotropic but not intended to limit the liquid crystal molecules.

Figure 8A:
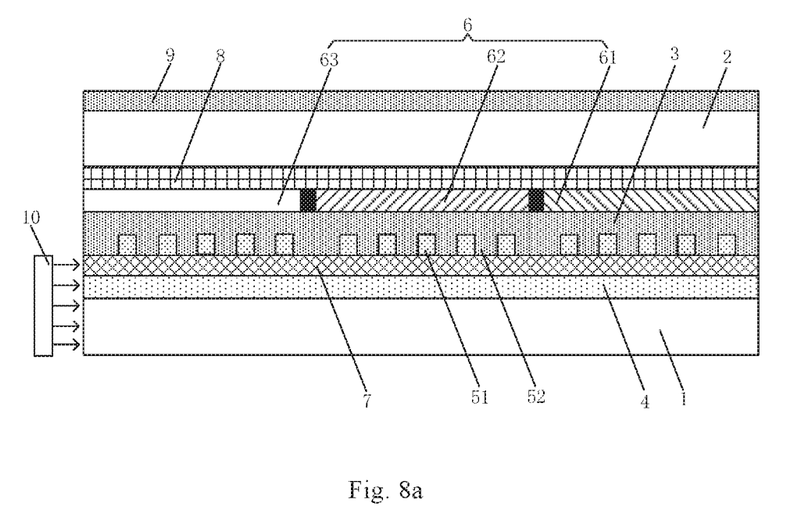
FIG. 8a is a schematic diagram of a display device, which is a VA display device, in a display mode.
Figure 8B:
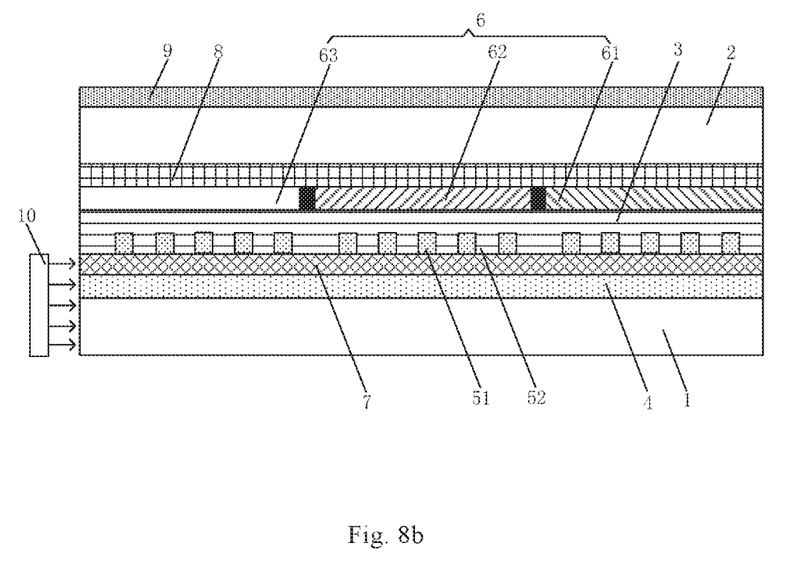
FIG. 8b is a schematic diagram of a display device, which is a VA display device, in another display mode.

FIG. 8a is a schematic diagram of a display device, which is a VA display device, in a display mode, and FIG. 8b is a schematic diagram of a display device, which is a VA display device, in another display mode. As shown in FIGS. 8a and 8b, the liquid crystal layer 3 may be made of a blue-phase liquid crystal. As shown in FIG. 8a, the difference between the voltages applied to the second electrode 7 and the first electrode 8 is adjusted to adjust liquid crystal molecules in the liquid crystal layer 3 to be isotropic, such that the refractive index of the liquid crystal layer 3 is equal to the refractive index of the grating layer, in this case, the grating layer controls light not to be coupled out of the waveguide layer 4, and thus the VA display device is in L0 grayscale state. As shown in FIG. 8b, the difference between the voltages applied to the second electrode 7 and the first electrode 8 is adjusted to adjust liquid crystal molecules in the liquid crystal layer 3 to be anisotropic such that the absolute value of the difference between the refractive index of the liquid crystal layer 3 and the refractive index of the grating layer is the set difference, which is the maximum difference, in this case, the grating layer controls the coupling efficiency at which light is coupled out of the waveguide layer 4 is the set coupling efficiency, which is the maximum coupling efficiency, and thus the VA display panel is in L255 grayscale state. It should be noted that the patterns in the liquid crystal layer 3 in FIGS. 8a and 8b merely indicate that liquid crystal molecules in the two figures are isotropic or anisotropic but not intended to limit the liquid crystal molecules.

Figure 9A:
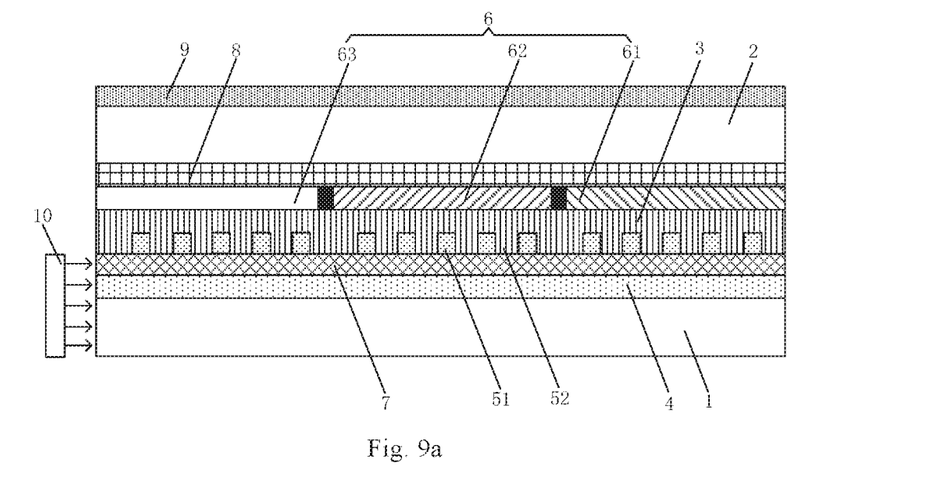
FIG. 9a is a schematic diagram of a display device, which is a VA display device, in a display mode.
Figure 9B:
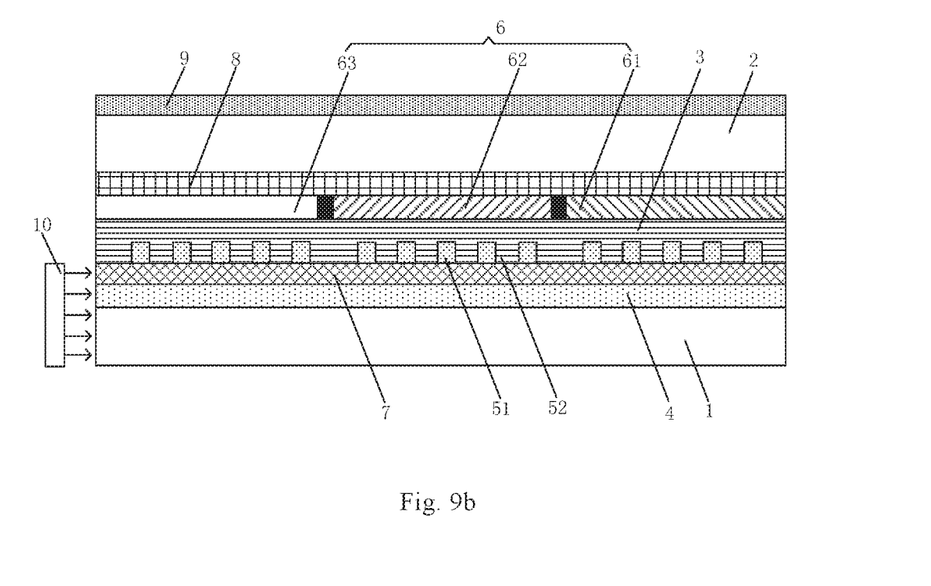
FIG. 9b is a schematic diagram of a display device, which is a VA display device, in another display mode.

FIG. 9a is a schematic diagram of a display device, which is a VA display device, in a display mode, and FIG. 9b is a schematic diagram of a display device, which is a VA display device, in another display mode. As shown in FIGS. 9a and 9b, the liquid crystal layer 3 may be made of a nematic liquid crystal. As shown in FIG. 9a, the difference between the voltages applied to the second electrode 7 and the first electrode 8 is adjusted to adjust orientations of liquid crystal molecules in the liquid crystal layer 3 such that the refractive index of the liquid crystal layer 3 is equal to the refractive index of the grating layer, in this case, the grating layer controls light not to be coupled out of the waveguide layer 4, and thus the VA display device is in L0 grayscale state. As shown in FIG. 9b, the difference between the voltages applied to the second electrode 7 and the first electrode 8 is adjusted to adjust orientations of liquid crystal molecules in the liquid crystal layer 3 such that the absolute value of the difference between the refractive index of the liquid crystal layer 3 and the refractive index of the grating layer is the set difference, which is the maximum difference, in this case, the grating layer controls the coupling efficiency at which light is coupled out of the waveguide layer 4 is the set coupling efficiency, which is the maximum coupling efficiency, and thus the VA display panel is in L255 grayscale state. It should be noted that the patterns in the liquid crystal layer 3 in FIGS. 9a and 9b merely indicate that liquid crystal molecules in the two figures are orientated differently but not intended to limit the orientations of the liquid crystal molecules.

In the embodiment, in a case where the display device is an ECB display device or a VA display device, since only e-polarized light whose vibration direction is in the principal plane (the cross section as shown in figures) can be influenced by the change in the refractive index of the liquid crystal layer 3, whereas o-polarized light whose vibration direction is perpendicular to the principal plane cannot be influenced by the change in the refractive index of the liquid crystal layer 3, the light coupled out of the waveguide layer 4 is e-polarized light, and the coupling efficiency of the e-polarized light can be controlled by controlling orientations of liquid crystal molecules in the liquid crystal layer 3, thereby implementing grayscale display. Therefore, when the display device is an ECB display device or a VA display device, the display device can generate polarized light with one vibration direction without providing a polarizer in the display panel, so as to achieve grayscale display without a polarizer in the display panel.

In the embodiment, in a case where the display device is an IPS display device, since both e-polarized light whose vibration direction is in the principal plane (the cross section as shown in figures) and o-polarized light whose vibration direction is perpendicular to the principal plane can be influenced by the change in the refractive index of the liquid crystal layer 3, the display device cannot have a good dark state display. Thus, a polarizing element may be provided at a light exiting side of the backlight 10, such that light emitted by the backlight 10 becomes light with one vibration direction, for example, o-polarized light or e-polarized light, after passing through the polarizing element. Therefore, when the display device is an IPS display device, the display device can generate polarized light with one vibration direction by providing a polarizing element only at a light exiting side of the backlight 10 (outside the display panel), that is, without providing a polarizer in the display panel, so as to achieve grayscale display without providing two polarizer layers in the display panel.

Different display modes are described above by taking only a few types of display devices as examples, and display modes of other types of display devices are not listed herein one by one.

In the display device provided in the embodiment, the display panel includes a second substrate, a first substrate, a liquid crystal layer, a waveguide layer, a grating layer, a quantum dot color filter layer, a first electrode and a second electrode. The first electrode and the second electrode are configured to adjust the refractive index of the liquid crystal layer by changing voltages applied thereto, and the coupling efficiency at which light is coupled out of the waveguide layer is determined according to a difference between the refractive index of the liquid crystal layer and the refractive index of the grating layer. In the embodiment, there is no need to provide a polarizer in the display panel, avoiding the problem of quantum dot depolarization, and thus making it possible to apply quantum dot material to a liquid crystal display device. In the embodiment, there is no need to provide a polarizer in the display panel, thereby improving the transmittance of the display panel. In the embodiment, since there is no need to provide a polarizer in the display panel, there is no requirement on amount of phase retardation of the entire liquid crystal layer, so that a liquid crystal cell may be set to have a smaller thickness, thereby improving response time of the liquid crystal. Since the display device of the embodiment has high transmittance, the display device can be applied to a transparent display product. In the embodiment, the display device employs a quantum dot material as a color filter, which has a narrow FWHM (full width at half maximum) at the wavelength of emergent light, a pure color and a high color gamut.

It could be understood that the above embodiments are merely exemplary embodiments adopted for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

What is claimed is:

1. A display panel, comprising a first substrate, a liquid crystal layer, a waveguide layer, a grating layer, a quantum dot color filter layer, a first electrode and a second electrode, wherein the liquid crystal layer, the grating layer, the quantum dot color filter layer, the first electrode and the second electrode are located between the waveguide layer and the first substrate and the quantum dot color filter layer is located on the first substrate, and the grating layer is located on a side of the waveguide layer proximal to the liquid crystal layer;
the first electrode and the second electrode are configured to adjust a refractive index of the liquid crystal layer by changing voltages applied thereto and a coupling efficiency at which light is coupled out of the waveguide layer is determined according to a difference between the refractive index of the liquid crystal layer and a refractive index of the grating layer to achieve grayscale display.

2. The display panel of claim 1, wherein the second electrode and the first electrode are located on one side of the liquid crystal layer.

3. The display panel of claim 1, wherein the second electrode and the first electrode are located on different sides of the liquid crystal layer.

4. The display panel of claim 1, wherein the refractive index of the grating layer ranges from an ordinary refractive index $n_o$ of the liquid crystal layer to an extraordinary refractive index $n_e$ of the liquid crystal layer.

5. The display panel of claim 4, wherein the refractive index of the grating layer is the extraordinary refractive index $n_e$ of the liquid crystal layer.

6. The display panel of claim 1, further comprising a second substrate located on a side of the waveguide layer distal to the first substrate.

7. The display panel of claim 6, wherein the second electrode is located on a side of the waveguide layer proximal to the first substrate, the grating layer is located on a side of the second electrode proximal to the first substrate, and the liquid crystal layer is located on a side of the grating layer proximal to the first substrate; and
the first electrode is located on a side of the first substrate proximal to the second substrate.

8. The display panel of claim 7, wherein the quantum dot color filter layer is located on a side of the first electrode proximal to the second substrate.

9. The display panel of claim 7, wherein the quantum dot color filter layer is located between the second electrode and the grating layer.

10. The display panel of claim 8, wherein a refractive index of the second electrode is smaller than a refractive index of the waveguide layer, and a refractive index of the second substrate is smaller than the refractive index of the waveguide layer.

11. The display panel of claim 1, wherein the liquid crystal layer is made of a nematic liquid crystal, a cholesteric liquid crystal, or a blue-phase liquid crystal.

12. The display panel of claim 1, wherein the grating layer comprises shading bars arranged at intervals, the liquid crystal layer covers the grating layer and fills gaps between the shading bars, and the liquid crystal layer has a thickness greater than a thickness of the grating layer.

13. The display panel of claim 1, wherein
in a case where the difference between the refractive index of the liquid crystal layer and the refractive index of the grating layer is zero, the coupling efficiency at which light is coupled out of the waveguide layer is zero, so that the display panel is in L0 grayscale state.

14. The display panel of claim 1, wherein in a case where an absolute value of the difference between the refractive index of the liquid crystal layer and the refractive index of the grating layer is equal to a set value, the coupling efficiency at which light is coupled out of the waveguide layer is a set coupling efficiency, so that the display panel is in L255 grayscale state.

15. The display panel of claim 1, wherein in a case where an absolute value of the difference between the refractive index of the liquid crystal layer and the refractive index of the grating layer is larger than zero and smaller than a set value, the coupling efficiency at which light is coupled out of the waveguide layer is larger than zero and smaller than a set coupling efficiency, so that the display panel is in a grayscale state between L0 grayscale state and L255 grayscale state.

16. A display device, comprising a backlight and the display panel of claim 1.

17. The display device of claim 16, wherein the backlight is located at a side of the display panel, the backlight is arranged at least correspondingly to the waveguide layer, and a light exiting direction of light from the backlight is parallel to a plane where the waveguide layer is located.

18. The display panel of claim 1, wherein the quantum dot color filter layer comprises a red quantum dot pattern, a green quantum dot pattern, and a transparent resin pattern.

* * * * *